United States Patent [19]
Whitington

[11] Patent Number: 6,131,028
[45] Date of Patent: Oct. 10, 2000

[54] METHOD OF PROVIDING SERVICES SPECIFIED BY FEATURE CODES BASED UPON LOCATION OF A WIRELESS TELEPHONE UNIT

[75] Inventor: Mitchel L. Whitington, Garland, Tex.

[73] Assignee: Integrated Telecom Solutions, Inc., Richardson, Tex.

[21] Appl. No.: 08/987,998

[22] Filed: Dec. 10, 1997

[51] Int. Cl.[7] .................................................. H04Q 7/20
[52] U.S. Cl. .......................... 455/435; 455/456; 455/433; 455/417
[58] Field of Search ..................... 455/435, 432, 455/433, 456, 414, 560, 418, 461, 417

[56] References Cited

U.S. PATENT DOCUMENTS

| | | | |
|---|---|---|---|
| 5,243,645 | 9/1993 | Bissell et al. ............................. | 379/211 |
| 5,479,484 | 12/1995 | Mukerjee et al. ....................... | 455/432 |
| 5,673,308 | 9/1997 | Akhavan ................................. | 455/461 |
| 5,684,859 | 11/1997 | Chanroo et al. ......................... | 455/433 |
| 5,752,186 | 5/1998 | Malackowski et al. ................. | 455/414 |
| 5,826,191 | 10/1998 | Krishnan ................................. | 455/432 |
| 5,878,115 | 3/1999 | Valentine et al. ....................... | 455/422 |
| 5,901,359 | 5/1999 | Malmstrom ............................. | 455/461 |
| 5,913,165 | 6/1999 | Foti ......................................... | 455/435 |
| 5,970,388 | 10/1999 | Will ......................................... | 455/31.2 |
| 5,978,673 | 11/1999 | Alperovich et al. .................... | 455/417 |

*Primary Examiner*—Dwayne D. Bost
*Assistant Examiner*—Erika A. Gary
*Attorney, Agent, or Firm*—Locke Liddell & Sapp LLP

[57] ABSTRACT

A method of providing services to a wireless telephone subscriber based upon the geographic location of the wireless telephone unit associated with the wireless telephone subscriber. A feature code specifies a location based service. In response to receiving the feature code, the method sends a query to a location finding service for the current location of the wireless telephone unit. The method provides the service specified by the feature code based upon a location returned from the location finding service.

4 Claims, 4 Drawing Sheets

METHOD OF PROVIDING SERVICES SPECIFIED BY FEATURE CODES BASED UPON LOCATION OF A WIRELESS TELEPHONE UNIT

CROSS-REFERENCE TO RELATED APPLICATION

The present application is related to co-pending Application Ser. No. 08/878026, filed Jun. 18, 1997, titled Location Based Method of and System for Forwarding Wireless Telephone Calls.

FIELD OF THE INVENTION

The present invention relates generally to wireless telecommunications, and more particularly to a method of providing services specified by feature codes to wireless telephone subscribers based upon the location of the wireless unit at the time the feature code is entered on the wireless unit.

DESCRIPTION OF THE PRIOR ART

People have become increasingly dependant upon the telephone in both their business and personal lives. Many people want or need to be able to make and receive telephone calls not only at their homes and offices but also while traveling, while visiting customer or remote offices, or at virtually any other remote location. Accordingly, wireless telephone services have become very popular.

Because of the mobile nature of wireless telephones, wireless system providers have the opportunity to provide services to wireless subscribers based upon the location of the subscriber's wireless unit. For example, in co-pending Application Ser. No. 08/878026, filed Jun. 18, 1997, titled location Based Method of and System for Forwarding Wireless Telephone Calls, there is disclosed a method of and system for processing a telephone call to a wireless telephone number associated with a mobile telephone unit by forwarding the call to one of a plurality of registered wireline numbers if the mobile unit is located near the geographic location associated with the wireline number. In response to a call placed to a wireless telephone number, the system of Application Ser. No. 08/878026 determines the geographic location of the mobile unit associated with the wireless telephone number. If the mobile unit is near a registered location, the system forwards the call to the registered wireline number associated with the registered location.

In Application Ser. No. 08/878026, the registered wireline numbers and locations are maintained in a subscriber record. Location and wireline number associations in the subscriber record are maintained and updated essentially manually with an order entry process. There is a need to automate the provisioning and deprovisioning of location and wireline number associations in a location-based call forwarding system.

In addition to location-based call forwarding services, subscribers may need other location-based services. Subscribers frequently travel to unfamiliar locations. It would be desirable if the subscriber could use the wireless telephone system to obtain a list of or directions to business establishments, such as restaurants, hotels, auto repair facilities near the subscriber's current location.

SUMMARY OF THE INVENTION

Briefly stated, the present invention provides a method of providing services to a wireless telephone subscriber based upon the geographic location of the wireless telephone unit associated with the wireless telephone subscriber. The method of the present invention receives a feature code specifying a service from a wireless telephone unit. In response to receiving the feature code, the method sends a query to a location finding service for the current location of the wireless telephone unit. The method provides the service specified by the feature code based upon a location returned from the location finding service. Examples of services according to the present invention are the provisioning and deprovisioning of location-based call forwarding services and providing lists of or directions to business establishments of the type identified by the feature code located near the wireless telephone unit.

DESCRIPTION OF THE PREFERRED EMBODIMENT

Figure 1:
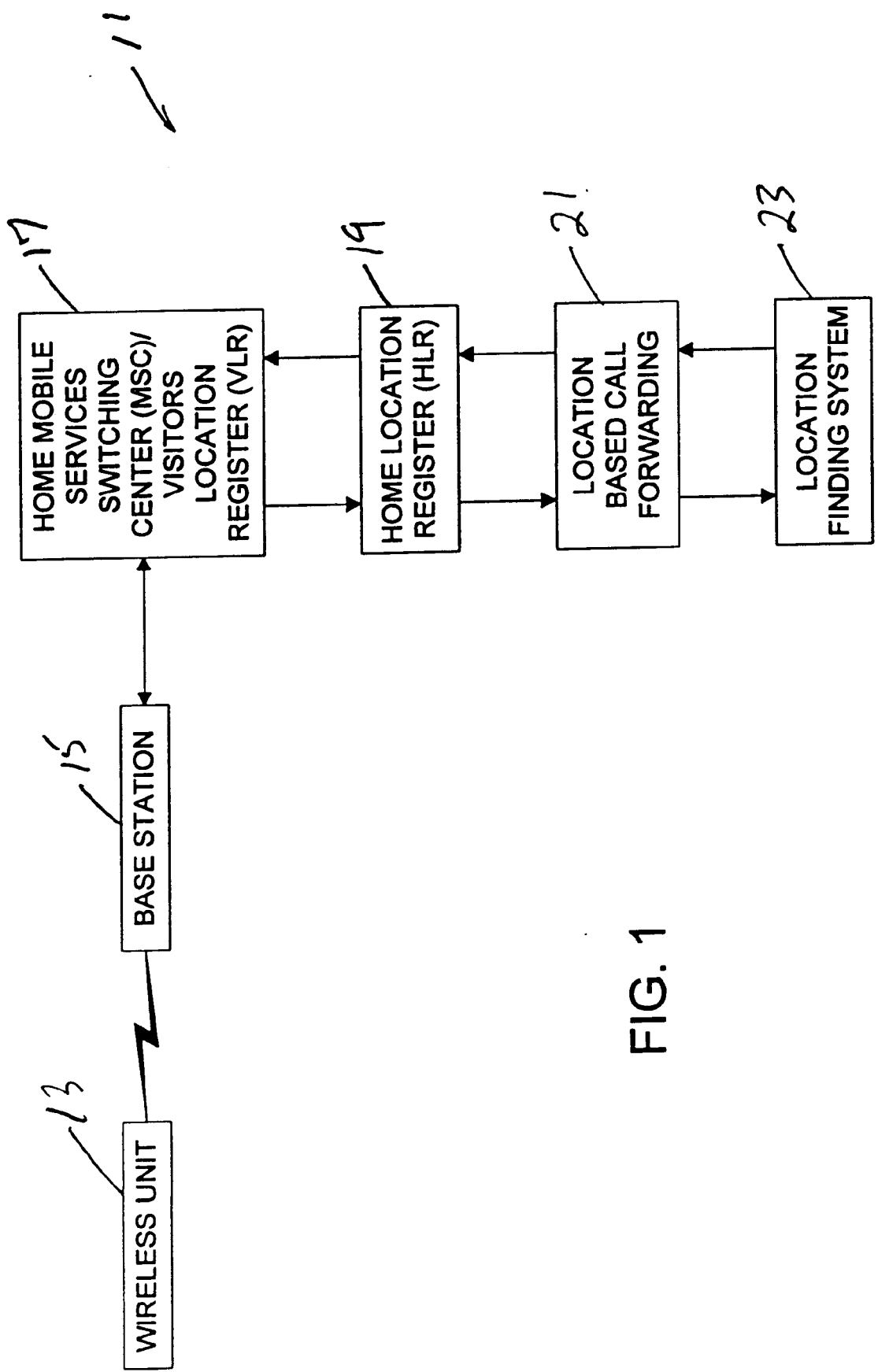
FIG. 1 is a block diagram of a system according to the present invention in a home market.

Referring now to the drawings, and first to FIG. 1, a wireless telephone system is designated generally by the numeral 11. System 11 includes a wireless unit 13, which is preferably a small portable cellular telephone that may be carried in a person's pocket, purse, briefcase, or the like. A base station 15 handles the wireless part of calls originated from or completed to wireless unit 13. Calls to and from wireless 13 are routed by base station 15 to an appropriate home mobile services switching center (MSC)/visitors location register (VLR) 17. A home location register (HLR) 19 includes a database that is used to identify a subscriber and to contain subscriber data related to features and service. According to co-pending Application Ser. No. 08/878,026, filed Jun. 18, 1997, one of the features and services available to wireless customers is location based call forwarding. Accordingly, system 11 includes a location based call forwarding service 21, which communicates with a location finding system 23.

The location of wireless unit 13 is monitored by location finding system 23. Cellular systems have always monitored the location of mobile units, at least to the cell granularity. Due to recent FCC dockets, wireless, and especially cellular, service providers are preparing their networks to support Emergency 911 services for cellular subscribers. Wireless 911 is being rolled out in phases, with the key differentiation among the phases being the accuracy in locating the wireless caller. In order to support the roll out of 911 services for wireless, manufacturers of radio equipment and other wireless technology have developed many types of location finding systems. An example of such a system is disclosed in Borkowsky et al. U.S. Pat. No. 5,519,760.

Co-pending Application Ser. No. 08/878,026 discloses a method and system for processing a telephone call to a wireless telephone number associated with a mobile telephone unit, such as wireless unit 13, by forwarding the call to one of a plurality of registered wireline numbers if the wireless unit is located near the geographic location associated with the wireline number. A call to the number corresponding to wireless unit 13 may be completed either to wireless unit 13 or to a registered wireline number according to the location of wireless unit 13. Location based call forwarding system 21 maintains a subscriber record for the subscriber associated with wireless unit 13, which includes a list of registered wireline telephone numbers and corresponding geographic locations.

Figure 2:
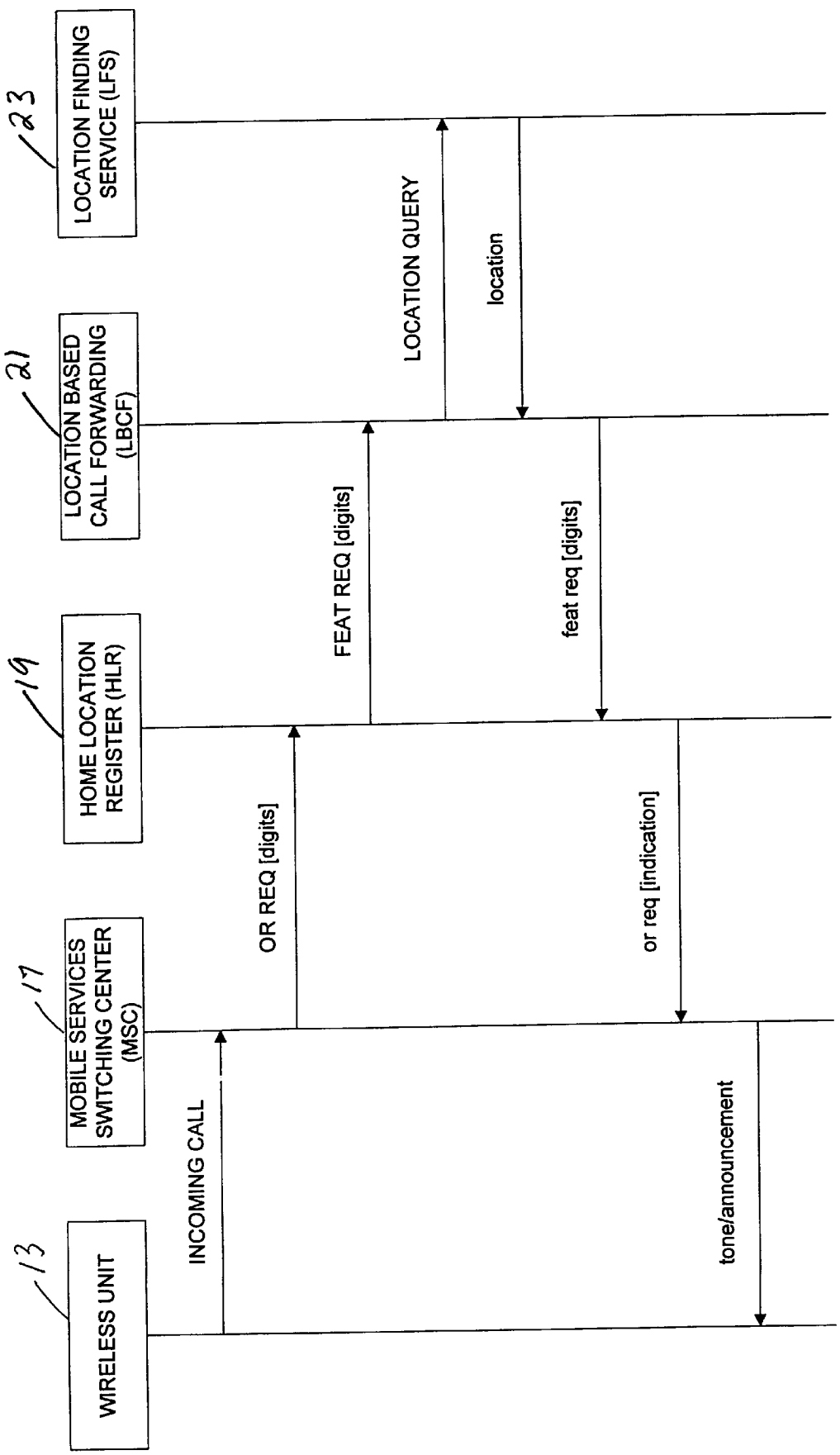
FIG. 2 is a call flow diagram of messaging in the system of FIG. 1.

According to the present invention, the location based call forwarding subscriber data base is maintained or updated with feature codes entered from wireless unit 13. Referring to FIGS. 1 and 2, when a wireless customer desires to register a wireline telephone number and corresponding geographic location with the location based call forwarding service, the wireless subscriber enters on wireless unit 13 a provisioning feature code and a wireline telephone number to which the subscriber wishes his or her wireless calls to be forwarded if the subscriber is near the location of the registered wireline number.

In the preferred embodiment, a feature code is a specified sequence of digits following an asterisk (*). A location based call forwarding provision feature code might be, for example, "*123." A pound sign (#) may be used as a delimiter between the feature code and the wireline telephone number. For example, the sequence "*123#2145551212" would be entered to provision the system to forward calls to wireless unit 13 to a wireline telephone number of 214-555-1212. A sequence "*321#2145551212" might be used to deprovision location based call forwarding to 214-555-1212. Similarly, other feature codes could be used to invoke other location based services. For example, a sequence "*456" could be used to obtain direction to the nearest gas station.

The feature code and telephone number are received by MSC 17 as an incoming call. MSC 17 identifies the feature code and sends an appropriate origination request with the digits corresponding to the wireline telephone number to HLR 19. HLR 19, in turn, sends a feature request with the appropriate digits to location based call forwarding service 21. As will be explained in detail hereinafter, location based call forwarding service 21 processes the feature request and sends a location query to location finding service 23. Location finding service 23 responds to the location query with the current location of wireless unit 13.

As will be explained in detail hereinafter, upon receipt of the location response from location finding service 23, location based call forwarding service 21 updates the subscriber record associated with wireless unit 13 with the location returned from location finding service 23. Location based call forwarding service 21 then responds to HLR 19 with a feature request acknowledgment. In response to receipt of the feature request acknowledgment, HLR 19 sends an origination request acknowledgment to MSC 17. MSC 17 sends a tone or announcement to wireless unit 13, which acknowledges that the telephone number entered by the subscriber with the feature code has been registered with the current location of wireless unit 13. The message flow described with respect to FIG. 2 is also applicable to deprovisioning of location based call forward and other location based wireless service features.

Figure 3:
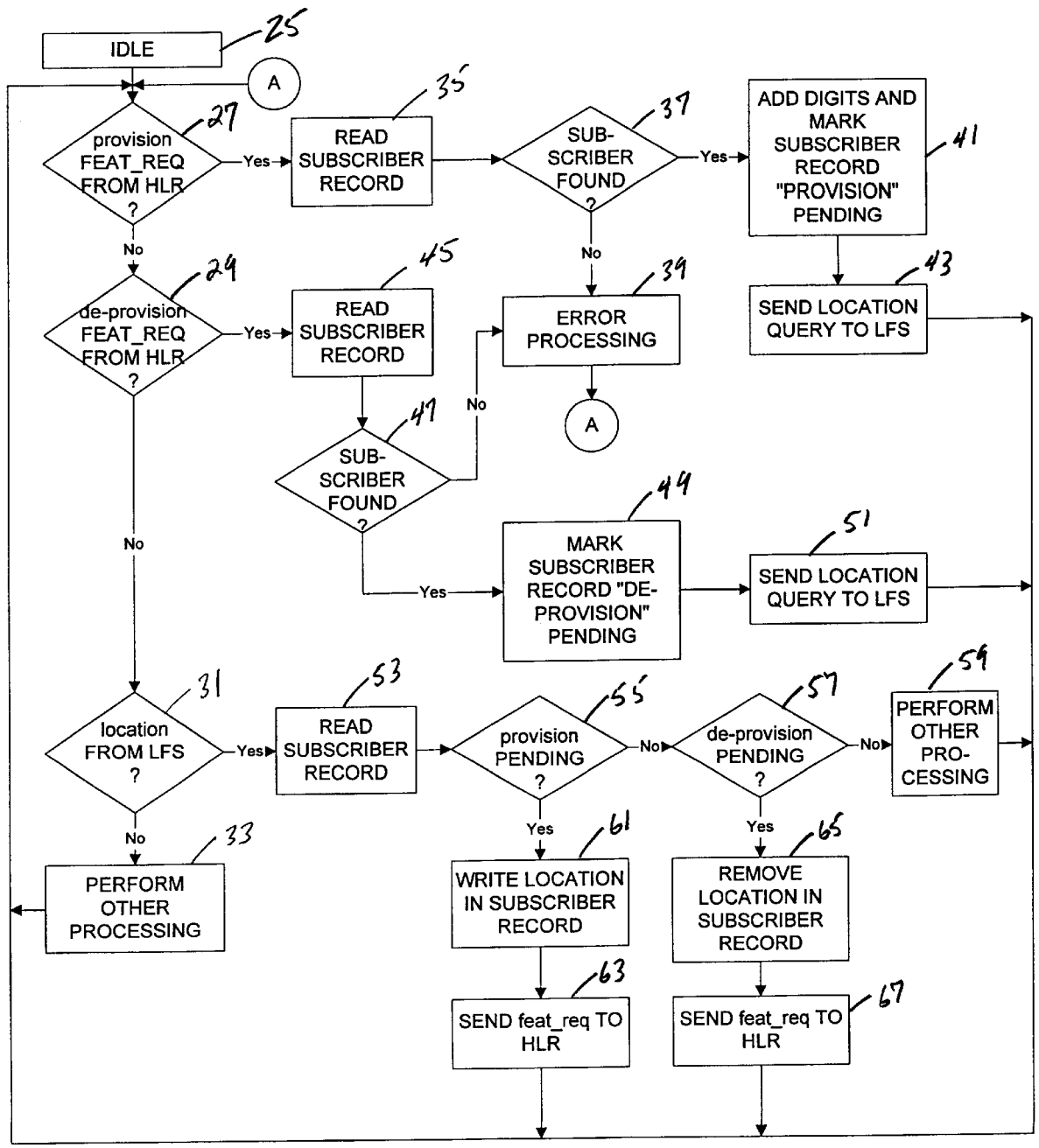
FIG. 3 is a flowchart of processing of the provisioning and deprovisioning of location based call forward carried out in the location based call forwarding service of the present invention.

Referring now to FIG. 3, there is shown a high level flow chart of processing that occurs in location based call forwarding service 21 during the provisioning and deprovisioning of location based call forwarding services. Initially, a location based call forwarding system is in an idle state, as indicated at block 25, waiting for a message. Upon receipt of a message, the system tests at decision block 27 whether or not the message is a provision feature request from HLR 19. If not, the system tests, at decision 29, whether not the message is a deprovision feature request from HLR 19. If not, the system tests, at decision block 31, whether or not the message is a location from location finding service 23. If not, the system performs other processing, as indicated generally at block 33, and returns to the idle state.

If, at decision block 27, the message is a provision feature request from HLR 19, the system reads the subscriber record associated with wireless unit 13 at block 35. The systems tests, at decision block 37, whether or not the subscriber is found. If not, the system performs error processing, as indicated generally at block 39, and returns to the idle state. If, at decision block 37, the subscriber is found, then the system adds to the subscriber record the digits received with the feature request and marks the subscriber record provision pending, at block 41. Then, the system sends a location query to location finding service 23, at block 43, and returns to the idle state.

If, at decision block 29, the message is a deprovision feature request from HLR 19, the system reads the subscriber record at block 45, and tests, at decision block 47, whether or not the subscriber is found. If not, the system performs error processing at block 39 and returns to the idle state. If, at decision block 47, the subscriber is found, then the system marks the subscriber record deprovision pending, at block 49. Then, the system sends a location query to location finding service 23, at block 51, and returns to the idle state.

If, at decision block 31, the message is a location from location finding service 23, then the system reads the subscriber record, at block 53, and tests, at decision block 55, whether or not the subscriber record is marked provision pending. If not, the system tests, at decision block 57, whether or not the subscriber record is marked deprovision pending. If not, the system performs other processing indicated generally at block 59 and returns to the idle state.

If, at decision block 55, the subscriber record is marked provision pending, then the system writes the location received from location finding service 23 in the subscriber record, at block 61. Then, the location based call forwarding service sends a feature request acknowledgment to HLR 19, at block 63, and returns to the idle state.

If, at decision block 57, the subscriber record is marked deprovision pending, then the location based call forwarding system removes the location in the subscriber record, at block 65, and sends a feature request acknowledgment to HLR 19, at block 67.

It is contemplated that the method of the present invention may be used for other location based services to wireless subscribers besides the provisioning and deprovisioning of location based call forwarding services. For example, the method of the present invention may be used to launch a voice response unit (VRU) application to provide information to wireless subscribers based upon their location. Examples of such a location based information service would be the retrieving of provisioned information for restaurants, hotels, or automobile repair or service facilities based on the subscriber's current location. The subscriber could be provided with directions to business establishments based upon the subscriber's current location.

Figure 4:
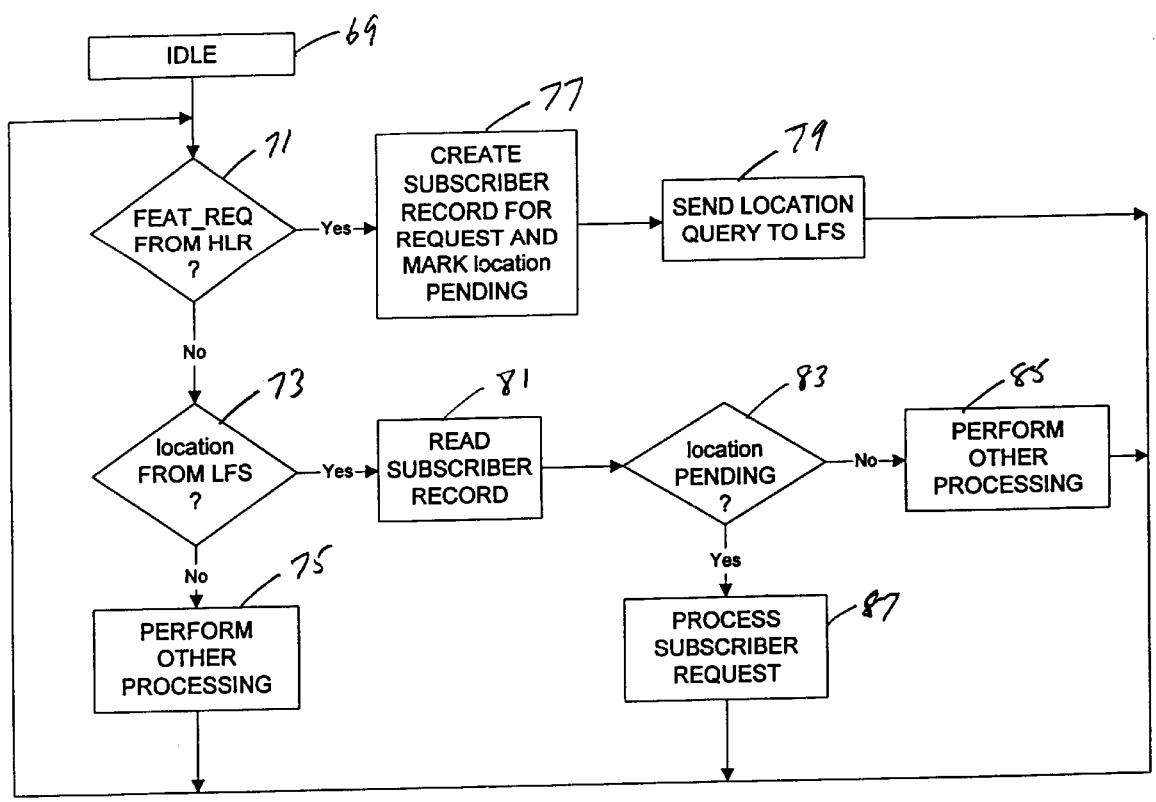
FIG. 4 is a flowchart of the processing of a general location based feature request in the location based call forwarding service of the present invention.

The processing taking place in location based call forwarding service 21 to provide general location based services to wireless customers is illustrated with respect to FIG. 4. The location based call forwarding service waits for messages in the idle state, as indicated generally at block 69. When the location based call forwarding system receives a message, it tests, at decision block 71, whether or not the message is a feature request from HLR 19. If not, the location based finding system tests, at decision block 73, whether or not the message is a location from location finding service 23. If not, the system performs other processing, indicated generally at block 75.

If, at decision block 71, the message is a feature request from HLR 19, the location based call forwarding service creates a subscriber record for the request and marks the subscriber record location pending, at block 77. Then, the location based call forwarding service sends a location query to location finding service 23, at block 79, and returns to the idle state.

If, at decision block 73, the message is a location from the location finding service, the location based call forwarding service reads the subscriber record at block 81 and tests, whether or not the subscriber record is marked location pending, at decision block 83. If not, the system performs other processing, at block 85, and returns to the idle state. If, at decision block 83, the subscriber record is marked location pending, then the system processes the subscriber request specified by the feature request, as indicated generally at block 87.

From the foregoing, it may be seen that the present invention provides a method of providing services specified by feature codes based upon the location of a wireless telephone unit. Although the present invention was described with respect to presently preferred embodiments, those skilled in the art, given the benefit of this disclosure, will recognize that certain disclosed features may be used independently of or in combination with other features. Moreover, location based services other than those described by example in the foregoing will be apparent to those skilled in the art. Accordingly, the spirit and scope of the present invention is determined from the following claims.

What is claimed is:

1. A method of maintaining subscriber records in a location-based wireless network service, which comprises the steps of:

receiving a feature request and a telephone number from a wireless telephone unit within a wireless network;

querying a wireless network location finding service for a current location of said wireless telephone unit anywhere within the wireless network;

updating a subscriber record associated with said wireless telephone unit according to said feature request and a location returned from said location finding service;

wherein said step of updating a subscriber record includes the steps of:

determining if said feature request is a location based wireless network de-provisioning feature request;

if so, adding said telephone number to said subscriber record; and marking said subscriber record for de-provisioning.

2. The method as claimed in claim 1, wherein said step of updating a subscriber record associated with said wireless telephone unit according to said feature request and a location returned from said location finding service includes the steps of:

receiving a returned location from said location finding service; and deleting the returned location received from said location finding service in said subscriber record if said subscriber record is marked for de-provisioning.

3. A method of providing location based wireless network services, which comprises the steps of:

maintaining a subscriber record for a wireless telephone unit, said subscriber record containing registered wireline telephone numbers and associated geographic locations for said registered telephone numbers;

receiving a feature request and a telephone number from said wireless telephone unit within a wireless network;

sending a query to a wireless network location finding service for a current location of said wireless telephone unit anywhere within the wireless network;

updating the subscriber record according to said feature request and said telephone number and a location returned from said location finding service in response to said query;

wherein said step of updating the subscriber record includes the steps of:

determining if said feature request is a location-based wireless network de-provisioning feature request; and if so, adding said telephone number to said subscriber record; and marking said subscriber record for de-provisioning.

4. The method as claimed in claim 3, wherein said step of updating the subscriber record associated with said wireless telephone unit according to said feature request and a location returned from said location finding service includes the steps of:

receiving a returned location from said location finding service; and deleting the returned location received from said location finding service in said subscriber record if said subscriber record is marked for de-provisioning.

* * * * *